United States Patent [19]

Alberti et al.

[11] Patent Number: 4,609,484

[45] Date of Patent: Sep. 2, 1986

[54] INORGANIC CATION EXCHANGERS AND THE PROCESS FOR THEIR PREPARATION

[75] Inventors: Giulio Alberti, Perugia; Francesco Bartoli, Rome; Umberto Costantino, Perugia; Francesco Di Gregorio, Monterotondo, all of Italy

[73] Assignee: ENI Ente Nazionale Idrocarburi, Rome, Italy

[21] Appl. No.: 635,407

[22] Filed: Jul. 30, 1984

[30] Foreign Application Priority Data

Aug. 1, 1983 [IT] Italy .............................. 22365 A/83

[51] Int. Cl.⁴ ......................... C09K 3/00; C01B 25/37
[52] U.S. Cl. .................................. 252/184; 502/208; 502/209; 423/308; 423/309
[58] Field of Search ................ 502/208, 209; 423/308, 423/309; 252/184

[56] References Cited

U.S. PATENT DOCUMENTS

| | | | |
|---|---|---|---|
| 3,416,884 | 12/1968 | Stynes et al. | 502/208 X |
| 3,558,273 | 1/1971 | Beck | 423/308 |
| 3,907,835 | 9/1975 | Kobylinski et al. | 502/208 X |
| 3,946,079 | 3/1976 | Mizutani et al. | 502/208 X |
| 4,396,535 | 8/1983 | Bremer et al. | 502/208 |

FOREIGN PATENT DOCUMENTS

| | | | |
|---|---|---|---|
| 666812 | 2/1952 | United Kingdom | 502/208 |
| 2056429 | 3/1981 | United Kingdom | 252/184 |

*Primary Examiner*—John F. Terapane
*Assistant Examiner*—Matthew A. Thexton
*Attorney, Agent, or Firm*—Hedman, Gibson, Costigan & Hoare

[57] ABSTRACT

Mixed phosphorous or arsenic salts of tetravalent metals are provided having the general formula $M(HAO_4)_{2-x}(HAO_3)_x \cdot nH_2O$, where M is Zr, Ti or Hf, A is phosphorus or arsenic, x is between 0.05 and 1.95, and n is 0 to 6. The salts are highly stable and have wide potential application in the fields of ion exchange, catalysis, intercalation of molecules, solid electrolytes, and chromatography. The salts are prepared by reacting a halide, oxyhalide, nitrate, sulphate, phosphate or oxide of the tetravalent metal, preferably in an aqueous medium, with at least two oxygenated acids of phosphorus and/or arsenic.

27 Claims, 4 Drawing Figures

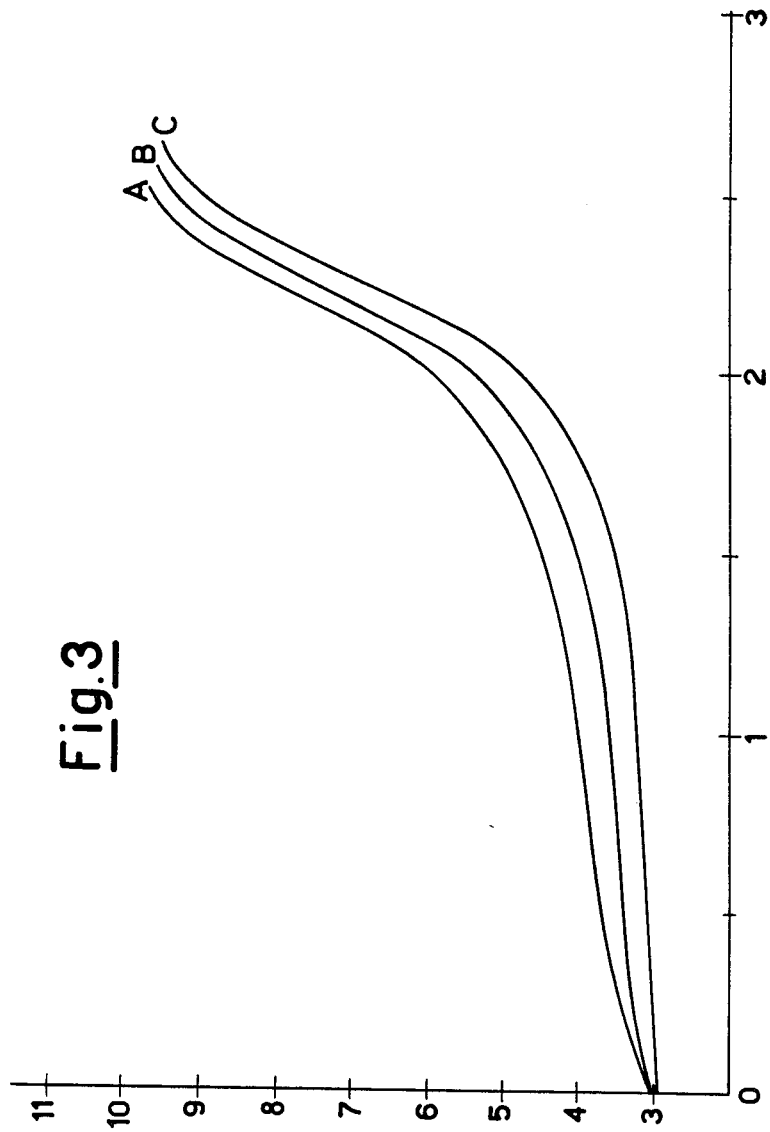

INORGANIC CATION EXCHANGERS AND THE PROCESS FOR THEIR PREPARATION

FIELD OF THE INVENTION

This invention relates to inorganic cation exchangers. More particularly, the invention relates to inorganic cation exchangers constituted by phosphates or arsenates of tetravalent metals in which part of the phosphate or arsenate groups is substituted by phosphite groups.

BACKGROUND OF THE INVENTION

The acid phosphates and arsenates of the tetravalent metals, of general formula $M(HAO_4)_2 \cdot nH_2O$ (A=P, As; M=Zr, Ti, Hf, Ge, Sn, Ce, Th) have been obtained not only as amorphous materials but also as semicrystalline and crystalline materials, both with a fibrous structure and with an $\alpha$ and $\gamma$ stratified structure.

These materials, and in particular zirconium acid phosphate, have been and are still the subject of intense research in various national and foreign laboratories because of their stability towards acids and/or oxidising agents, their high resistance both to temperature and to ionising radiation, and their potential application in the field of ion exchange, heterogeneous catalysis, intercalation of molecules with proton acceptor groups, solid electrolytes and chromatograph supports.

A compendium of the enormous amount of experimental work carried out up to the present time can be found in certain magazines (see for example G. Alberti in Account of Chemical Research, 11, 163, 1978) and in some recent monographs in scientific tests [see for example the first three chapters of "Inorganic Ion Exchange Materials" by A. Clearfield, G. Alberti and U. Costantino respectively (Editor Clearfield) CRC Press USA 1982, and Chapter V by G. Alberti and U. Costantino in "Intercalation Chemistry" (Editors Whittingham and Jacobson) Academic Press, USA 1982].

Zirconium acid phosphate, $\alpha$-$Zr(HPO_4)_2 \cdot H_2O$, has a stratified structure with a distance of 7.56 Å between layers. Each layer is constituted by a plane of zirconium atoms sandwiched between two layers of $O_3P$—OH tetrahedron groups. The structure is such that each zirconium atom is octahedrally coordinated with six oxygens of six different $O_3P$—OH groups. The distance between two $O_3P$—OH groups on the same face of any layer is 5.3 Å, so that the free area connected with each group can be evaluated at about 24 Å$^2$. The various layers are packed together in such a manner that in the interlayer region cavitites of the zeolite type form interconnected by windows having a maximum diameter of 2.64 Å. Ion exchange processes for ions which are larger than this size, or intercalation processes for molecules of large cross-section are either impossible or take place with extremely slow kinetics.

This drawback has been partly obviated by substituting 50% of the protons by sodium ions. This forms zirconium phosphate monosodium pentahydrate $ZrHPO_4 \cdot NaPO_4 \cdot 5H_2O$, which has a distance of 11.6 Å between layers. The sodium ion is then successively substituted by larger ions. It has been surprisingly found that the aforesaid drawbacks of the known art can be obviated by using an inorganic cation exchanger in which part of the phosphate (or arsenate) groups has been substituted by phosphite groups, and it has also been surprisingly found that the substitution leads to solid solutions containing both phosphate (or arsenate) ions and phosphite ions.

SUMMARY OF THE INVENTION

The cation exchangers according to the invention are such that the free area connected with each phosphate (or arsenate) group increases proportionally to the phosphite groups present, whereas the steric impediments to large ion or molecule diffusion in the interlayer region decrease.

BRIEF DESCRIPTION OF THE DRAWINGS

FIG. 1B—a diagrammatic elevational perspective view of the mixed zirconium acid salt shown in FIG. 1A, illustrating the stratified planar structure.

FIG. 3—titration curves for $Zr(HPO_4)_{0.66}(HPO_3)_{1.34}$ with hydroxides of Mg (line A) Ca (line B) and Ba (line C) plotting milliequivalents of hydrooxide added per gram of the salt vs. pH.

DESCRIPTION OF THE PREFERRED EMBODIMENTS

Figure 1A:
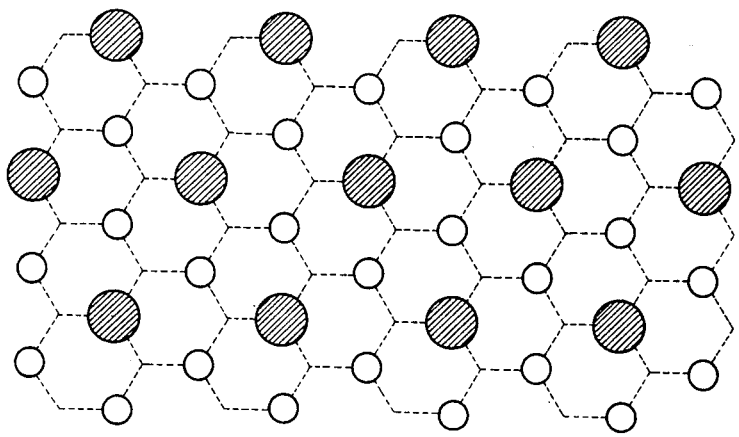
FIG. 1A—a diagrammatic plan view of the assumed molecular structure of a stratified zirconium phosphate-phosphite according to this invention.

A first subject matter of the present invention is an inorganic cation exchanger constituted by a solid solution of acid salts of a tetravalent metal with at least two oxygenated acids, of tetrahedron structure, of the elements phosphorus and/or arsenic. Preferably the oxygenated acids are only two in number, and have the elements phosphorus and/or arsenic in two different oxidation states, in particular the oxidation states 5 and 3.

The cation exchangers according to the invention correspond to the general formula $M(HAO_4)_{2-x} \cdot (HAO_3)_x \cdot nH_2O$, where M is the tetravalent metal and A is phosphorus or arsenic.

Preferred pairs of acids according to the invention are the following: phosphoric acid-phosphorous acid; arsenic acid-phosphorous acid.

The tetravalent metal is chosen from Zr, Ti, Hf.

The cation exchanger according to the invention can also be amorphous, and in this case the values of x in the aforesaid general formula vary from 0.05 to 1.95, and n is a while number of fraction between 0 and 6.

The cation exchanger according to the invention can also be semi-crystalline, and in this case the values of x and n are the same as for the amorphous material, but a stratified structure in created with a distance between layers of between 10.6 Å and 5.5 Å.

The preferred form of the cation exchanger according to the invention is however crystalline, and it has been surprisingly found that not every composition between x=0 and x=2 is possible.

In this respect, with reference to the aforesaid preferred pairs, three different classes with different distances between layers have been determined, of general formula

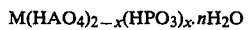

$M(HAO_4)_{2-x}(HPO_3)_x \cdot nH_2O$ where A is As or P as heretofore, and M is Zr in particular. In the first class, x is between 0.05 and about 0.5

(distance between layers 7.6–7.2 Å), in the second class x is between 1.02 and about 1.50 (distance between layers 6.9–6.2 Å), and in the third class x is between about 1.80 and 1.95 (distance between layers 6.0–5.5 Å).

The value of n for the first class is between 0 and 1, for the second class is between 0 and 0.5, and for the third class is between 0 and 0.2. By way of example, a cation exchanger according to the invention corresponds to the general formula $Zr(HPO_4)_{0.66}(HPO_3)_{1.34}\cdot nH_2O$ where n is between 0 and 0.3, the distance between layers being $6.55\pm0.05$ Å.

The ion exchange capacity depends on the quantity of $O_3P$—OH or $O_3As$—OH groups present, and for the three classes of materials indicated heretofore this quantity is therefore 1.95–1.5, 0.98–0.50 and 0.2–0.05 equivalents per formula weight respectively.

Ion exchange experiments with monovalent ions ($Li^+$, $Na^+$, $K^+$, $NH_4^+$, $Cs^+$, $Ag^+$ and $Tl^+$) and bivalent ions ($Mg^{2+}$, $Ca^{2+}$, $Ba^{2+}$ and $Cu^{2+}$) have shown that all the protons of the $O_3A$—OH groups present in the compounds $Zr(HAO_4)_{2-x}\cdot(HPO_3)_x$ can be easily exchanged, and some experiments with aliphatic monoamines have shown that each $O_3A$—OH group is able to protonate an amino group with consequent intercalation of the monoamine in the interlayer region.

X-ray diffraction measurements using the powder method have shown that the diffraction maximum position corresponding to $d_{002}$ depends on the dimensions of the exchanged ions and the length of the intercalated molecules, so confirming that all the tetravalent metal phosphate-phosphites and arsenate-phosphites according to the present invention have a stratified structure if crystalline. The distance between layers given heretofore have therefore been deduced from the $d_{002}$ diffraction maximum position in the powder diffraction spectrum. By simultaneously determining the distance between layers and the material density and applying the formula $n=pd/M$, where $p$ is the density (g/cc), d is the distance between layers (in cm) and M is the formula weight, a value of n has been obtained for all the zirconium phosphate-phosphites examined which is very close to that of $\alpha$—$Zr(HPO_4)_2\cdot H_2O$ ($6.8\times10^{-10}$ moles $cm^{-2}$).

According to G. Alberti and colleagues, J. Inorg. Nucl. Chem. 41, 643, 1979, this means that the mixed zirconium acid salts according to the present invention have a stratified structure of type similar to that of $\alpha$—$Zr(HPO_4)_2\cdot H_2O$. As an example, FIGS. 1 (A and B) shows diagrammatically the assumed structure for $Zr(HPO_4)_{0.66}(HPO_3)_{1.34}$.

Figure 1B:
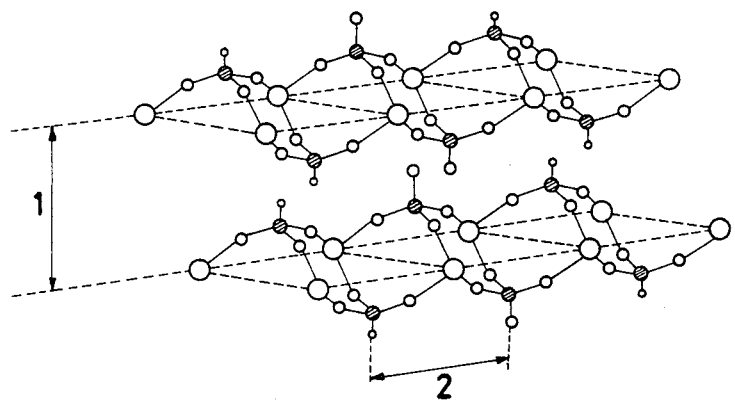

In FIG. 1B, the large black circles indicate Zr, the shaded circles indicate P, the white circles indicate oxgen and the small black circles indicate hydrogen atoms.

In FIG. 1A, the white circles represent the phosphite group and the shaded circles represent the phosphate group.

The distance 1 between the two layers is 6.55 Å; the distance 2 is 5.3 Å.

FIG. 1A represents a plan view, whereas FIG. 1B represents a side view.

The tetravalent metal phosphate-phosphites and arsenate-phosphites are thermally stable up to a relatively high temperature. For example the thermal behaviour of $Zr(HPO_4)_{1.7}(HPO_3)_{0.3}\cdot 0.2H_2O$ is very similar to that of $Zr(HPO_4)_2\cdot H_2O$.

The hydration water is completely lost at a temperature of less than 100° C., and pyrophosphate condensation takes place at a temperature exceeding 300° C.

Finally, in the presence of air the phosphites oxidise to phosphates at a temperature greater than 600° C., and thus at 1000° C. the product is transformed completely into $ZrP_2O_7$ of cubic structure. The thermal behaviour of $Zr(HPO_4)_{0.66}(HPO_3)_{1.34}$ is considerably different from that of zirconium phosphate in that the pyrophosphate is formed at a relatively lower temperature. Its thermal decomposition can be shown schematically as follows:

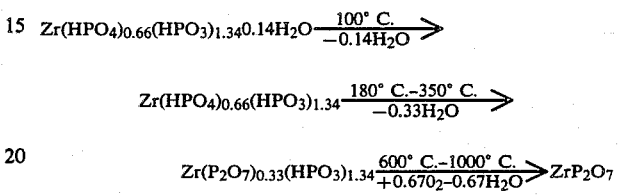

A second subject matter of the present invention is the process for preparing the inorganic cation exchanger heretofore described.

The process according to the invention consists of reacting a compound of the tetravalent metal, preferably in an aqueous environment, with at least two oxygenated acids (preferably two) of phosphorus and arsenic.

The tetravalent metal is chosen from Zr, Ti, Hf, and its compound is chosen from halides, oxyhalides, nitrates, sulphates, phosphates and oxides.

The pairs of acids are preferably the following pairs: phosphoric acid-phosphorous acid, arsenic acid-phosphorous acid.

If two oxygenated acids are used, and in particular the aforesaid pairs, the total concentration of the oxygenated acids is between 0.5 and 14M, and the ratio in solution of the total moles of acids to the moles of the tetravalent metal is at least 2.

The temperatures and reaction times are as follows: to obtain the amorphous product, the temperature is less than 50° C. and the time less than 1 hour; to obtain the semicrystalline product, the temperature is between 50° C. and the boiling point of the solution and the time is between 1 and 100 hours; to obtain the crystalline product the temperature can be chosen in accordance with the pressure between the following values: boiling point at atmospheric pressure, with a reaction time of between 100 and 1000 hours, or boiling point at 300° C. in an autoclave for a time of between 10 and 100 hours.

It should be noted that the degree of crystallinity is higher the higher the total acid concentration, and increases as the reaction time increases.

The crystalline exchangers can also be obtained by boiling the amorphous phosphates or phosphites under reflux directly in mixtures of $H_3PO_4$ and $H_3PO_3$.

Again with reference to obtaining crystalline materials with the aforesaid pairs of acids and with a total acid concentration of between 0.5M and 14M and a ratio of total moles of acids to moles of tetravalent metal of at least 2, the reaction can be conducted in the presence of a complexing agent for the tetravalent metal, and in this case the temperature is between ambient temperature and the solution boiling point, with a time of between 1 and 100 hours.

Using this method, a complexing agent for the metal is added to a solution of a M (IV) salt, followed for example by a mixture of the acids $H_3PO_4$ and $H_3PO_3$.

Precipitation is then obtained by gradually removing the complexing agent. If this is volatile (such as HF) it can be left to evaporate in an open vessel at a temperature between ambient temperature and the solution boiling point, or can be removed by bubbling steam or an inert gas such as nitrogen into the solution.

It should be noted that the degree of crystallinity of the product is higher the slower the removal of the complexing agent. If the complexing agent is not volatile (for example oxalic acid) or if larger crystals are required, the M (IV) complex can be decomposed thermally by gradually heating the solution in a closed vessel from ambient temperature to about 100° C.

In order to obtain crystalline exchangers with a distance between layers of between 7.6 and 7.2 Å, the total concentration of the mixture of the phosphoric and phosphorous acids (or arsenic and phosphorous acids) is between 2 and 14M, and preferably 8–12M, the molar fraction of the phosphoric or arsenic acid being between 0.98 and 0.75.

To obtain crystalline exchangers with a distance between layers of between 6.9 and 6.2 Å, the total concentration of the mixture of the two acids is between 2 and 14M, and preferably 8–12M, and the molar fraction of the phosphoric acid is between 0.83 and 0.65, and that of the arsenic acid is between 0.94 and 0.80.

To obtain crystalline exchangers with a distance between layers of between 6.0 and 5.5 Å, the total acid concentration is the same, and the molar fraction of the phosphoric or arsenic acid is between 0.70 and 0.1.

To obtain crystalline exchangers with the three aforesaid ranges of distance between layers, in the presence of a complexing agent, preferably HF, the total concentration of the mixture of the two acids is between 2 and 10M, and preferably between 4 and 6M, the molar fraction of the phosphoric or arsenic acid being as heretofore stated.

The complexing agent is used at an initial molar concentration of about 2–10 times that of the metal, and preferably 4–8 times. The details of the preparation, the ion exchange properties and intercalation properties of some of the compounds according to the present invention are described in the following examples, which in no case are to be taken as limitative of the invention itself.

EXAMPLE 1

Preparation of zirconium phosphate-phosphite of composition $Zr(HPO_4)_{1.7}(HPO_3)_{0.3}$ and distance between layers of 7.5 Å.

50 ml of a solution containing 1.2M $ZrOCl_2$ and 7.2M HF are mixed with 450 ml of a solution containing 5M $H_3PO_4$ and 0.78M $H_3PO_3$. This solution is placed in an open plastics vessel and heated to about 80° C. for 48 hours to allow decomposition of the zirconium fluorocomplexes. The solution volume is kept constant by adding distilled water. The precipitate obtained is separated by centrifuging or filtration, and washed with distilled water to about pH 4. The precipitate has the composition $Zr(HPO_4)_{1.7}(HPO_3)_{0.3}$.

The precipitate, allowed to condition over a saturated NaCl solution at ambient temperature (relative humidity 75%), has the composition $Zr(HPO_4)_{1.7}(HPO_3)_{0.3}.0.2H_2O$. The powder spectrum obtained by X-ray diffraction is given in Table 1.

EXAMPLE 2

Preparation of crystalline zirconium phosphate-phosphite of stratified structure and composition $Zr(HPO_4)_{0.85}(HPO_3)_{1.15}$ and distance between layers of 6.7 Å.

50 ml of a solution containing 1.2M $ZrOCl_2$ and 7.2M HF are added to 450 ml of a solution containing 4.8M $H_3PO_4$ and 1.2M $H_3PO_3$. The procedure of Example 1 is followed, allowing the precipitation to take place for four days.

On conditioning at 75% relative humidity, the product contains about 0.14 moles of water per formula weight, and has a distance between layers of 6.7 Å.

EXAMPLE 3

Preparation of crystalline zirconium phosphate-phosphite of stratified structure and composition $Zr(HPO_4)_{0.66}(HPO_3)_{1.34}$ and distance between layers of 6.55 Å.

50 ml of a solution containing 1.2M $ZrOCl_2$ and 7.2M HF are added to 450 ml of a solution containing 4.4M $H_3PO_4$ and 1.33M $H_3PO_3$. The procedure of Example 1 is followed. The X-ray powder diffraction spectrum for the product obtained is given in Table 1.

EXAMPLE 4

Preparation of semicrystalline zirconium phosphate-phosphite of stratified structure and composition $Zr(HPO_4)_{0.1}(HPO_3)_{1.9}$ with distance between layers of 5.7 Å.

50 ml of a solution containing 1.2M $ZrOCl_2$ and 7.2M HF are added to 450 ml of a solution containing 2.5M $H_3PO_4$ and 2.5M $H_3PO_3$. The procedure of Example 2 is then followed.

EXAMPLE 5

Preparation of zirconium phosphate-phosphite with a distance between layers of 6.9–6.5 Å by boiling under reflux.

250 ml of a suspension obtained by adding 25 ml of a 1.3M solution of $ZrOCl_2$ to 225 ml of a solution containing 8.3M $H_3PO_4$ and 3.7M $H_3PO_3$ are placed in a flask fitted with a reflux condenser. The precipitate obtained is boiled for a time of between 1 and 7 days. After separation by centrifuging or filtration, the precipitate is washed with distilled water to about pH 4. The degree of crystallinity increases as the boiling time increases, and the distance between layers decreases continuously from 6.9 Å to about 6.6–6.5 Å.

EXAMPLE 6

Preparation of zirconium phosphate-phosphite with a distance between layers of 6.5 Å using the hydrothermal method. This was obtained by the following procedure:

25 ml of a 1.3M solution of $ZrOCl_2$ are mixed with 225 ml of a solution containing 3.6M $H_3PO_4$ and 2M $H_3PO_3$, and the mixture left in an autoclave for 2 days at 230° C.

EXAMPLE 7

Preparation of zirconium arsenate-phosphite with a distance between layers of 6.4 Å from solutions containing HF.

500 ml of a solution containing 0.13 M $ZrOCl_2$, 0.72M hydrofluoric acid, 4.9M arsenic acid and 0.3M phosphorous acid are prepared. The procedure of Example 1 is then followed.

The product, conditioned at 75% relative humidity, has a distance between layers of 6.4 Å.

EXAMPLE 8

Titration curves for $Zr(HPO_4)_{0.66}(HPO_3)_{1.34}$ with hydroxides of certain monovalent metals in the presence of added salt.

0.05 g of $Zr(HPO_4)_{0.66}(HPO_3)_{1.34}$ are suspended under agitation in 100 ml of a 0.1N solution of M(I)Cl [0.1M $TlNO_3$ in the case of Tl(I)]. Titration was then carried out with 0.1M M(I)OH using a Mettler automatic titrimeter.

Figure 2:
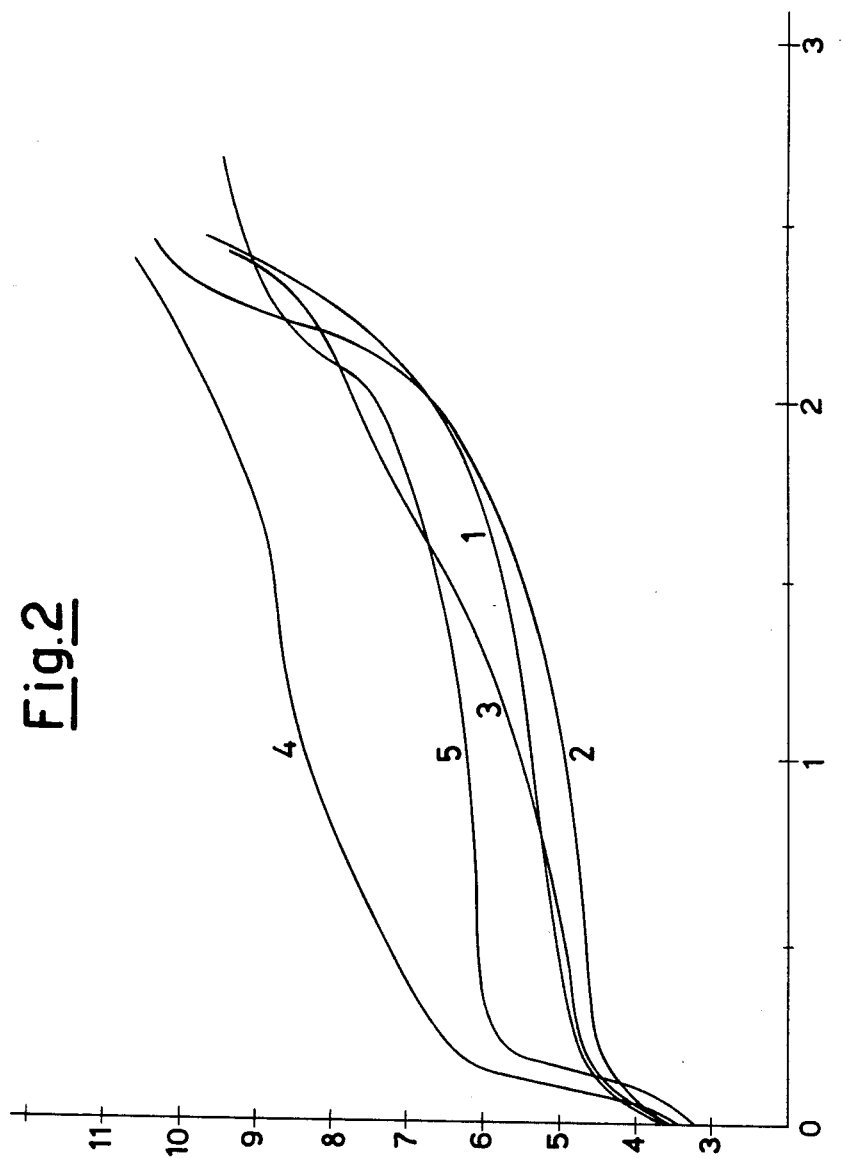
FIG. 2—titration curves for $Zr(HPO_4)_{0.66}(HPO_3)_{1.34}$ with LiOH (line 1), NaOH (line 2), KOH (line 3), CsOH (line 4) and Tl(I)OH (line 5) plotting milliequivalents of hydroxide added per gram of the salt vs. pH.

The titration curves obtained with LiOH (curve 1), NaOH (curve 2), KOH (curve 3), CsOH (curve 4) and Tl (I) OH (curve 5) are shown in FIG. 2.

The abscissa axis represents milliequivalents of hydroxide added per g of exchanger. The ordinate axis represents the pH.

EXAMPLE 9

Titration curves for $Zr(HPO_4)_{0.66}(HPO_3)_{1.34}$ with hydroxides of certain bivalent metals in the presence of added salt. Titration is carried out with the automatic titrimeter as in Example 1. The titration curves in the presence of 0.05M added salt for Mg (curve A), Ca (curve B) and Ba (curve C) ions are shown in FIG. 3. The abscissa axis represents milliequivalents of hydroxide added per gram of exchanger. The ordinate axis represents the pH.

EXAMPLE 10

Preparation of $ZrCu_{0.3}(PO_4)_{0.66}(HPO_3)_{1.34}$ 0.5 g of $Zr(HPO_4)_{0.66}(HPO_3)_{1.34}$ are suspended under agitation in 100 ml of a 0.1M copper acetate solution.

After about 1 day of contact, the precipitate is separated from the solution and washed with distilled water.

The distance between layers of the sample (conditioned at 75% relative humidity) is 7.6 Å.

EXAMPLE 11

Intercalation of some n-alkyl monoamines (ethylamine, n-propylamine, n-butylamine) in $Zr(HPO_4)_{0.66}(HPO_3)_{1.34}$.

0.5 g of $Zr(HPO_4)_{0.66}(HPO_3)_{1.34}$ are suspended under agitation in 50 ml of a 0.1M solution of the hydrochloride of the n-alkylmonoamine to be intercalated. Titration is then carried out with 0.1M solution of the same n-alkylamine using an automatic titrimeter. On termination of titration the materials have the approximate composition $Zr(HPO_4)_{0.66}(HPO_3)_{1.34}0.6C_2H_5NH_2$, $Zr(HPO_4)_{0.66}(HPO_3)_{1.34}0.62C_3H_7NH_2$, and $Zr(HPO_4)_{0.66}(HPO_3)_{1.34}0.65C_4H_9NH_2$, and the distance between layers is 10.8 Å, 11.6 Å and 13.4 Å respectively.

EXAMPLE 12

Intercalation of some n-alkanols (butanol, pentanol and octanol) in $Zr(HPO_4)_{0.66}(HPO_3)_{1.34}$.

0.5 g of $Zr(HPO_4)_{0.66}(HPO_3)_{1.34}$ are suspended in 50 ml of the pure alkanol and kept under agitation for 24 hours at ambient temperature. The solid is then separated from the solution and the X-ray powder spectrum is then determined for the intercalates obtained. The distance between layers for the intercalates with butanol, pentanol and octanol are 11.2 Å, 12.1 Å and 13.8 Å respectively.

TABLE 1

X-ray powder diffraction spectra obtained for zirconium phosphate-phosphite of composition $Zr(HPO_4)_{1.7}(HPO_3)_{0.3}$ (column a) and for zirconium phosphate-phosphite of composition $Zr(HPO_4)_{0.66}(HPO_3)_{1.34}$ (column b).

| (a) | | (b) | |
|---|---|---|---|
| d(Å) | I | d(Å) | I |
| 7.52 | vs | 13.1 | w |
| 4.80 | vw | 6.55 | s |
| 4.50 | w | 4.64 | w |
| 4.44 | vw | 4.33 | vw |
| 4.02 | vw | 4.21 | w |
| 3.77 | vw | 3.57 | vs |
| 3.56 | s | 3.37 | vw |
| 3.52 | m | 2.69 | w |
| 3.31 | vw | | |
| 3.21 | w | | |
| 3.17 | w | | |
| 2.65 | w | | |
| 2.63 | m | | |
| 2.62 | w | | |
| 2.50 | w | | | d(Å) = distance between layers in Å;
I = intensity.
v = very;
s = strong;
m = medium;
w = weak.

We claim:

1. A cation exchanger comprising a solid solution of tetravalent metal acid salt of at least two oxygenated acids, of tetrahedron structure, of the elements phosphorous and/or arsenic, said cation exchanger further corresponding to the formula $M(HAO_4)_{2-x}(HAO_3)_x \cdot nH_2O$, where M is a tetravalent metal selected from Zr, Ti or Hf; A is phosphorus or arsenic; x is between 0.05 and 1.95; and n is a whole number or fraction between 0 and 6.

2. A cation exchanger as claimed in claim 1, characterised in that the oxygenated acids of phosphorus and/or arsenic are only two in number.

3. A cation exchanger as claimed in claim 2, characterised in that the two oxygenated acids are chosen from the pairs: phosphoric acid-phosphorous acid; arsenic acid-phosphorous acid.

4. A cation exchanger as claimed in claim 1, characterised by being amorphous and corresponding to the general formula

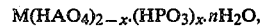
$M(HAO_4)_{2-x}(HPO_3)_x \cdot nH_2O$, where M is the tetravalent metal, A is phosphorus or arsenic, x is between 0.05 and 1.95, and n is a whole number or fraction between 0 and 6.

5. A cation exchanger as claimed in claim 1, characterised by being semicrystalline of stratified structure, and corresponding to the general formula

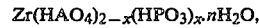
$Zr(HAO_4)_{2-x}(HPO_3)_x \cdot nH_2O$, where A is phosphorus or arsenic, x is between 0.05 and 1.95, and n is between 0 and 6, the distance between layers being between 10.6 Å and 5.5 Å.

6. A cation exchanger as claimed in claim 1, characterised by being crystalline with a stratified structure, and corresponding to the general formula

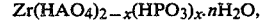
$Zr(HAO_4)_{2-x}(HPO_3)_x \cdot nH_2O$, where A is phosphorus or arsenic, x is between 0.05 and 0.5, and n is between 0 and 1, the distance between layers being between 7.6 Å and 7.2 Å.

7. A cation exchanger as claimed in claim 1, characterised by being crystalline with a stratified structure and corresponding to the general formula $$Zr(HAO_4)_{2-x}(HPO_3)_x \cdot nH_2O,$$

where A is phosphorus or arsenic, x is between 1.02 and 1.50, and n is between 0 and 0.5, the distance between layers being between 6.9 Å and 6.2 Å.

8. A cation exchanger as claimed in claim 7, characterised by being crystalline with a stratified structure and corresponding to the formula $$Zr(HPO_4)_{0.66}(HPO_3)_{1.34} \cdot nH_2O,$$

where n is between 0 and 0.3, the distance between layers being 6.55±0.05 Å.

9. A cation exchanger as claimed in claim 1, characterised by being semicrystalline with a stratified structure and corresponding to the general formula $$Zr(HAO_4)_{2-x}(HPO_3)_x \cdot nH_2O,$$

where A is phosphorus or arsenic, x is between 1.80 and 1.95, and n is between 0 and 0.2, the distance between layers being between 6.0 Å and 5.5 Å.

10. A process for preparing a cation exchanger having the formula $M(HAO_4)_{2-x}(HAO_3)_x \cdot nH_2O$, where M is a tetravalent metal selected from Zr, Ti or Hf, A is phosphorus or arsenic, x is between 0.05 and 1.95, and n is a whole number or fraction between 0 and 6, said process comprising reacting a compound of a tetravalent metal with at least two oxygenated acids of phosphorus and/or arsenic.

11. A process as claimed in claim 10, characterized in that said reaction is carried out in an aqueous environment.

12. A process as claimed in claim 11, characterised in that the tetravalent metal compound is chosen from halides, oxyhalides, nitrates, sulphates, phosphates and oxides.

13. A process for preparing a cation exchanger as claimed in claim 12, characterised in that only two oxygenated acids are used.

14. A process as claimed in claim 13, characterized in that the two oxygenated acids are chosen from the pairs: phosphoric acid-phosphorous acid and arsenic acid-phosphorous acid.

15. A process as claimed in claim 14, characterised in that the concentration of the two oxygenated acids is between 0.5 and 14M, and the ratio of the total moles of acid to the moles of tetravalent metal in the solution is at least 2.

16. A process as claimed in claim 15, characterised in that the reaction between the tetravalent metal compound and the pair of acids is conducted at a temperature of less than 50° C.

17. A process as claimed in claim 15, characterised in that the reaction is conducted at a temperature of between 50° C. and the solution boiling point for a time of between 1 and 100 hours.

18. A process as claimed in claim 15, characterised in that the reaction is conducted at the solution boiling point under atmospheric pressure for a time of between 100 and 1000 hours, or in an autoclave at a temperature between the boiling point and 300° C. for a time of between 10 and 100 hours.

19. A process as claimed in claim 15, characterised in that the reaction is conducted at a temperature between ambient temperature and the solution boiling point for a time of between 1 and 100 hours in the presence of a complexing agent for the tetravalent metal.

20. A process as claimed in claim 19, characterised in that the complexing agent is hydrofluoric acid.

21. A process for preparing a cation exchanger as claimed in claim 18, characterised in that the total concentration of the mixture of the phosphoric and phosphorus acids or arsenic and phosphorous acids is between 2 and 14M, the molar fraction of the phosphoric or arsenic acid being between 0.98 and 0.75.

22. A process for preparing a cation exchanger as claimed in claim 21, characterised in that the reaction is conducted in the presence of hydrofluoric acid having an initial molar concentration of approximately 2–10 times preferably 4–8 times that of the zirconium, the total concentration of the mixture of the two acids being between 2 and 10M preferably between 4 and 6M, and the temperature being between ambient temperature and about 100° C.

23. A process for preparing a cation exchanger as claimed in claim 15, characterised in that the total concentration of the mixture of the phosphoric and phosphorous acids or arsenic and phosphorous acids is between 2 and 14M, the molar fraction of the phosphoric acid being between 0.83 and 0.65, and the molar fraction of the arsenic acid being between 0.94 and 0.80.

24. A process for preparing a cation exchanger as claimed in claim 23, characterised in that the reaction is conducted in the presence of hydrofluoric acid having an initial molar concentration of 2–10 times preferably 4–8 times that of the tetravalent metal, the total concentration of the mixture of the two acids being between 2 and 10M preferably between 4 and 6M, being between ambient temperature and about 100° C.

25. A process for preparing a cation exchanger as claimed in claim 15, characterised in that the total concentration of the mixture of phosphoric and phosphorous acids or arsenic and phosphorous acids is between 2 and 14M, the molar fraction of the phosphoric or arsenic acid being between 0.70 and 0.1.

26. A processs for preparing a cation exchanger as claimed in claim 25, characterised in that the reaction is conducted in the presence of hydrofluoric acid having an initial molar concentration of about 2–10 times preferably 4–8 times that of the tetravalent metal, the total concentration of the mixture of the two acids being between 2 and 10M preferably between 4 and 6M, and the temperature being between ambient temperature and about 100° C.

27. A method for intercalating polar molecules comprising suspending a cation exchanger of the formula $M(HAO_4)_{2-x}(HAO_3)_x \cdot nH_2O$, where M is a tetravalent metal selected from Zr, Ti or Hf, A is phosphorus or arsenic, x is between 0.05 and 1.95, and n is a whole number or fraction between 0 and 6, in a solution of polar molecules, and agitating such suspension until intercalates are formed.

* * * * *